United States Patent
Ha et al.

(10) Patent No.: US 7,028,011 B1
(45) Date of Patent: Apr. 11, 2006

(54) HYBRID OPTICAL RECORDING DISC WITH COPY PROTECTION

(75) Inventors: Bruce Ha, Webster, NY (US); Steven A. Glaza, Pittsford, NY (US); Cheryl M. Bianchi, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 571 days.

(21) Appl. No.: 09/393,527

(22) Filed: Sep. 10, 1999

(51) Int. Cl.
*G06F 17/60* (2006.01)

(52) U.S. Cl. .......................... 705/57; 705/50; 705/51; 705/52; 705/53; 705/54; 705/55; 705/56; 705/58; 705/59; 713/2; 428/641; 428/64.1; 386/95

(58) Field of Classification Search ............... 369/50, 369/54, 116, 32, 47, 58; 705/50–59; 713/2; 428/641, 64.1; 386/95
See application file for complete search history.

(56) References Cited

U.S. PATENT DOCUMENTS

| | | | |
|---|---|---|---|
| 4,644,493 A | | 2/1987 | Chandra et al. |
| 5,305,296 A | * | 4/1994 | Kono .......................... 369/116 |
| 5,379,433 A | * | 1/1995 | Yamagishi ................. 340/5.31 |
| 5,740,244 A | | 4/1998 | Indeck et al. |
| 5,745,568 A | | 4/1998 | O'Connor et al. |
| 5,761,301 A | * | 6/1998 | Oshima et al. ............... 705/57 |
| 5,805,699 A | | 9/1998 | Akiyama et al. |
| 5,930,209 A | * | 7/1999 | Spitzenberger et al. .. 369/47.12 |
| 5,930,825 A | | 7/1999 | Nakashima et al. |
| 6,052,465 A | * | 4/2000 | Gotoh et al. ............. 369/53.21 |

FOREIGN PATENT DOCUMENTS

| | | | |
|---|---|---|---|
| DE | EP 0769544 A1 | * | 4/1997 |
| EP | 0 769 544 A1 | | 4/1997 |

OTHER PUBLICATIONS

Wright, Guy. Burn Your own. Interativity; v2 n12 p44. Nov 1996. Retrieved from Dialog Apr. 4, 2005.*

* cited by examiner

*Primary Examiner*—James A Reagan
(74) *Attorney, Agent, or Firm*—Raymond L. Owens

(57) ABSTRACT

A hybrid optical recording disc having copy protection for use in a computer, including a read-only area having preformed information including at least one program and disc identifier data; a recordable area; and the disc identifier data being adapted to authenticate a transferred program in the computer to permit the program to be operated by the computer.

11 Claims, 3 Drawing Sheets

HYBRID OPTICAL RECORDING DISC WITH COPY PROTECTION

FIELD OF THE INVENTION

The present invention relates to optical recording discs and more particularly to a hybrid disc having a read-only memory (ROM) area and a recordable area in which the ROM area contains embedded identifiers which provide protection against copying software programs mastered in the ROM area of the disc.

BACKGROUND OF THE INVENTION

Hybrid optical recording discs are discs having a read-only memory (ROM) area and a recordable area for recording or writing data which are usually generated by a computer user and which are recorded on the disc by a recorder controlled by a computer. Such a disc has a substrate which is usually formed by injection molding against a master plate so that the substrate will have a continuous spiral track extending from an inner edge to an outer edge of the substrate. The spiral track is usually a groove which provides data channels on the disc and also provides for tracking of the disc while reading or recording data. In the ROM area of a mastered hybrid optical disc substrate the tracks or grooves are modulated in the form of depressions or pits which correspond to disc addressing data and to disc program data. The mastered substrate is then coated with a recording layer which can include an organic dye selected to absorb radiation from an optical recorder to further modify the depressions in the tracks of the ROM area, or to modulate the tracks in the recordable area. Upon coating the recording layer, a reflective layer is formed over the entire recording layer. The reflective layer can be, for example, gold, silver, or copper. A protective layer, usually of a polymer organic material, is formed over the reflective layer.

The tracks or grooves of a hybrid optical recording disc, the degree of modulation of the tracks by mastered or recorded data, as well as the arrangement of addressing and program data is usually provided in accordance with Orange Book specifications. "Orange Book" is a specification published by Philips Corporation and Sony Corporation which defines key properties of recordable compact disc media and recording procedures.

A recorder, also referred to as a laser writer, is a device which accepts a recordable optical disk and records in its tracks or grooves data stored in a memory device of a computer, for example, data stored in a hard disc of a computer, under the control of the computer, thus forming depressions or pits in the recording layer of the optical disc. Recorders and blank optical recording discs are now readily and affordably available to many computer users. Thus, in the absence of copy protection, licensed software programs mastered in a ROM area of a hybrid optical disc can be transferred from the hybrid optical disc to a memory device of a computer, and downloaded from the computer to a recorder for recording a copy of the software programs to a blank optical recording disc.

In order to prevent unauthorized copying of licensed or copyrighted software programs contained in originally purchased data storage means (for example, CD-ROMS, and magnetic storage media), several proposals have been advanced which have a common central feature of restricting or of limiting the installation of licensed or copyrighted software programs to one particular computer (or a particular hardware) or to a selected group of computers, and conversely to permit authorized copying of licensed or copyrighted software to a target storage means of a particular computer.

For example, O'Connor et al., U.S. Pat. No. 5,745,568 discloses a method and system for securing CD-ROM data for retrieval by a specified computer system. A region of an optical disc is encrypted with a hardware identifier as an encryption key. The hardware identifier is associated to the selected computer hardware. The software program files contained in the CD-ROM are encrypted therein using the hardware identifier as an encryption key. The selected software programs on the CD-ROM are installed on the selected computer by decrypting the software program files using the hardware identifier as an encryption key.

Akiyama et al., U.S. Pat. No. 5,805,699, propose a software copying system which enables copyrighted software recorded in a master storage medium to be copied to a user's target storage medium in a legitimate manner. The master storage medium (i.e., CD-ROM) has a software identifier, and the target storage medium has a storage medium identifier. The two identifiers are sent to a central site which manages licensing for the rights to copy software products. At the central site, a first signature is generated from the two identifiers which is sent back to the computer user. In the computer of the user a second signature is generated from the same two identifiers. Only when the two signatures coincide with each other can the software programs be copied from the master storage medium to the target storage medium.

Chandra et al., U.S. Pat. No. 4,644,493 discloses a method and apparatus which restricts software distribution used on magnetic media to use on a single computer. The original software contained on the magnetic medium is functionally uncopyable until it is modified by the execution of a program stored in a tamper-proof co-processor which forms a part of the computer.

Indeck et al., U.S. Pat. No. 5,740,244 discloses an implementation by which a software product on a magnetic medium may first instruct a computer in which it is inserted to read a fingerprint of a specified portion of the product and to compare this fingerprint with a pre-recorded version of the same fingerprint. If the fingerprints match, then the software product may permit the computer to further read and implement the application software stored thereon.

With the accelerated availability of new computer systems having new or upgraded operating systems, it appears that each of the foregoing disclosures would require renewed matching of still useful previously purchased software programs to a particular newly acquired computer, which is a rather cumbersome and moderately complex procedure.

SUMMARY OF THE INVENTION

It is an object of the present invention to provide software titles on a medium which can be inserted into a CD-ROM drive of any computer for installing the software programs thereon, and to provide protection against copying such software programs from the computer to a copy medium.

It is another object of the present invention to provide a hybrid optical recording disc with copy protection wherein software programs contained in a read-only memory (ROM) area of the hybrid disc can be installed on a computer or on a plurality of computers while preventing the copying of installed software to a blank copy medium.

These objects are achieved in a hybrid optical recording disc having copy protection for use in a computer, comprising:

(a) a read-only area having preformed information including at least one program and disc identifier data;

(b) a recordable area; and (c) the disc identifier data being adapted to authenticate a transferred program in the computer to permit the program to be operated by the computer.

An advantage of the present invention is to provide a hybrid optical recording disc which contains in a read-only memory (ROM) area software programs in the form of software program data which can be readily installed on a computer.

Another advantage of the present invention is that user generated data pertaining to such installed software programs can be retrieved from the computer for recording by a recorder on a recordable area of the disc, thus providing both a mastered software content and a recorded content of data related to the software programs on one and the same hybrid optical recording disc.

A feature of the hybrid optical recording disc of the present invention is that the ROM area of the disc includes mastered addressing tracks in which a disc identifier is embedded in a sub-code such that the disc identifier will not be transferred to a memory device of the computer when installing the software programs from the disc to the computer.

DETAILED DESCRIPTION OF THE INVENTION

Figure 1:
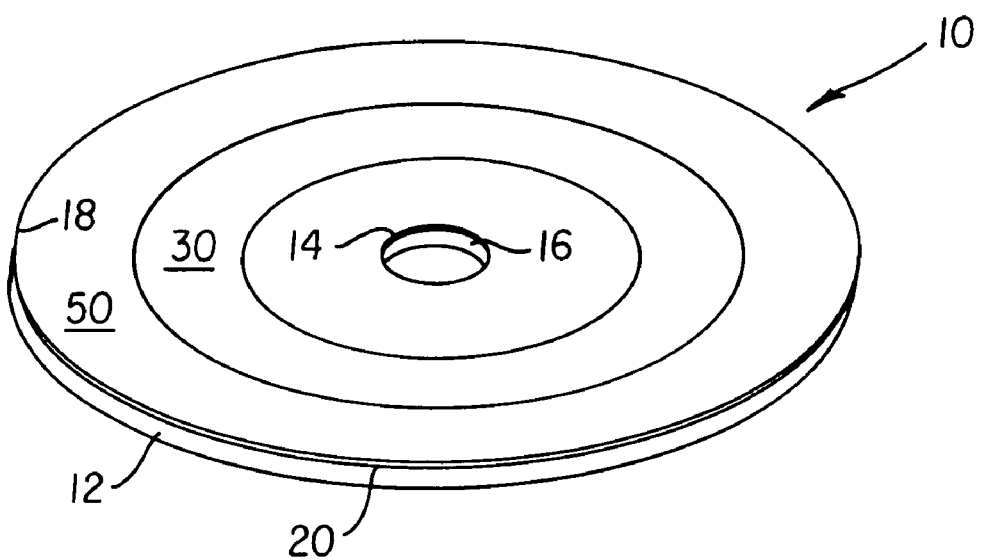
FIG. 1 is a simplified schematic view of a hybrid optical recording disc having a ROM area and a recordable area.
Figure 2:
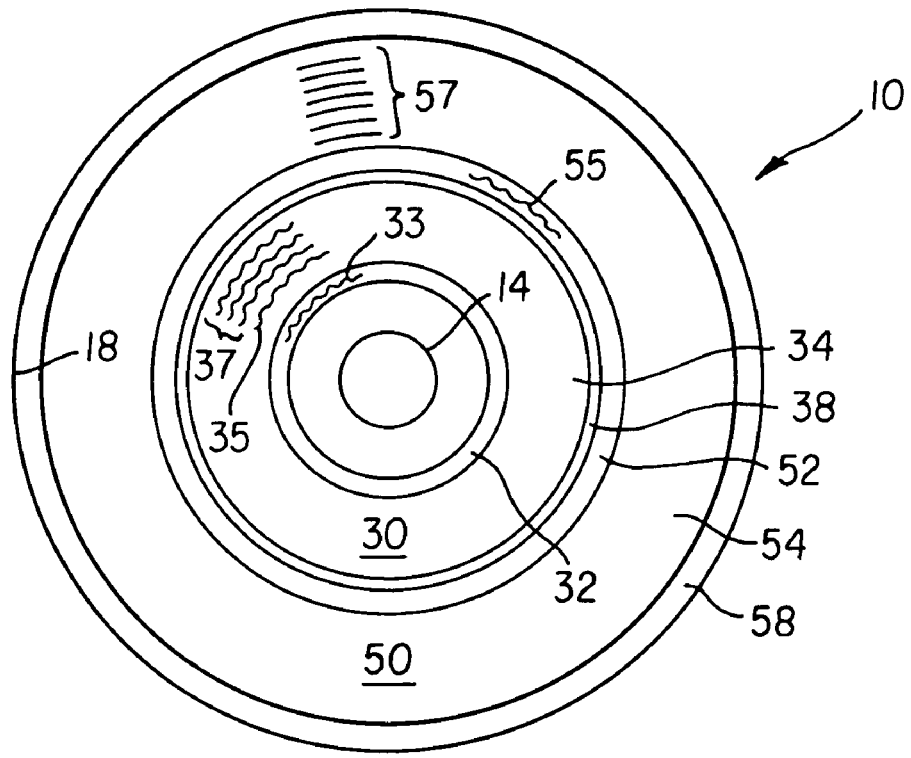
FIG. 2 is a schematic plan view of the hybrid optical recording disc shown in FIG. 1, indicating lead-in areas, program areas, lead-out areas, and examples of particular tracks in accordance with the present invention.

Referring to FIGS. 1 and 2, a hybrid optical recording disc 10 is shown in accordance with the present invention. The hybrid optical recording disc 10 has a substrate 12 in which an inner peripheral edge 14 forms a central hole 16, and the disc 10 having an outer peripheral edge 18. The central hole 16 permits the hybrid optical recording disc 10 to be mounted in an optical disc transport device which can be used in either a reading or in a recording mode. The hybrid optical recording disc 10 includes a read-only memory (ROM) area 30 and a recordable area 50. Although it is necessary only to have a single ROM area 30 and a single recordable area 50 in a region near the central hole 16, there can be a plurality of interspersed areas 30 and 50 near the central hole 16, while in a region near the outer peripheral edge 18 there is only the recordable area 50. Overlying the substrate 12 is a recording layer 20 which can contain a dye responsive to radiation, such as for example, laser radiation, directed from a recorder onto the recording layer 20 such that physical and/or optical properties of the recording layer 20 are changed during data recording. However, it will be understood that the recording layer 20 can be formed from a so-called rewritable material such as a magnetooptic material or from so-called phase change material, and the present invention is not limited to a recording layer containing a dye. For purposes of simplifying the drawings, a reflective layer overlying the recording layer 20, and a protective layer overlying the reflective layer are not shown in the drawings.

The substrate 12 is formed of a radiation-transmissive material, for example a polycarbonate material, which is capable of transmitting therethrough radiation from a laser used for reading and recording data on the hybrid optical recording disc 10. The substrate 12 is preferably constructed by injection molding against a master which has mastered thereon a spiral groove (not shown). Portions of the spiral groove form tracks, such as for example the tracks 33, 35, 37, 55, and 57 schematically depicted in FIG. 2. Alternatively, the spiral groove and associated tracks may be formed by embossing or stamping a groove into one surface of the substrate through a master.

In accordance with specifications of the "Orange Book," both the ROM area 30 and the recordable area 50 are partitioned. The ROM area 30 is partitioned into a lead-in area 32, a program area 34, and a lead-out area 38. The recordable area 50 is partitioned to include a lead-in area 52, a program area 54, and at least one lead-out area 58. Depending upon particular applications of the hybrid optical recording disc 10 by a computer user, the recordable area 50 may contain a plurality of lead-in areas, program areas, and lead-out areas.

Within the ROM area 30 are included addressing tracks dedicated to contain disc addressing data which govern read and record processes to and from a computer, and program tracks dedicated to contain computer software programs. Thus, the tracks of the ROM area 30 are modulated by depressions or pits which correspond to addressing and/or program data. Such modulated tracks are also referred to as wobble tracks, and are depicted schematically in wavy outline as tracks 33, 35, and 37 within the ROM area 30 of the disc 10.

In accordance with one aspect of the present invention, the addressing tracks of the ROM area 30 include at least one disc identifier sub-code track 33 which contains disc identifier data which are embedded in this track such that the disc identifier data will not be transferred to a memory device of a computer when the disc is installed on the computer. The disc identifier sub-code track 33 is schematically shown as being formed along a portion of the aforementioned groove within the lead-in area 32. The disc identifier sub-code can be embedded, alternatively, in a portion of a wobble track associated with a power calibration area (PCA) or with a program memory area (PMA), such tracks (not shown) preceding the lead-in area 32.

In accordance with another aspect of the present invention the program tracks 37 of the ROM area 30 include at least one program identifier track 35 which contains program identifier data which identify the licensed computer software programs mastered in the program tracks 37.

The lead-out area 38 of the ROM area 30 contains data which instructs a computer of the termination of the ROM program area 34 and includes data which indicate a start of a new lead-in area 52 associated with the recordable area 50 of the hybrid optical recording disc 10.

The recordable area 50 includes a plurality of program tracks 57 in a program area 54 of the recordable area 50. The program tracks 57 are shown schematically in straight outline to indicate that data have not yet been recorded therein. The program tracks 57 of the recordable area 50 include at least one software identifier track 55 which contains software identifier data recorded therein to identify with greater specificity each one of the computer software programs which are included in the program tracks 37 of the ROM area 30. Accordingly, the software identifier track 55 is shown in wavy outline. The recording of such software identifier data can be performed by a provider of the software programs, and alternatively, the software identifier data can be recorded by the disc manufacturer upon prior agreement with the software provider. In any event, the software identifier data recorded in the software identifier track 55 will be different for each hybrid optical recording disc 10, while the previously described disc identifier data and the program identifier data as well as program data mastered in program tracks 37 will be the same data for all discs manufactured in a specified lot or in a specified run of a manufacturing cycle. The software identifier track 55 is preferably located within the lead-in area 52 of the recordable area 50 of the disc 10.

The disc identifier data embedded in the disc identifier sub-code track 33, the program identifier data embedded in the program identifier track 35, and the software identifier data recorded in the software identifier track 55 can comprise data representative of a sequence of numeral designations such as, for example, a six-digit numeral designation.

Of the above described identifier data, mastered and recorded in respectively corresponding tracks of the hybrid optical recording disc 10 in accordance with the present invention, the disc identifier data embedded in the disc identifier sub-code track 33 will not be transferred to a memory device of a computer when installing the disc addressing data and the computer software program data to a computer from the disc 10 providing protection against copying the software programs of the disc onto a copy medium. The data after having been installed from the disc then will be authenticated by the disc identifier data as to the authenticity of the original disc. The disc identifier data once transferred to the computer memory does not transfer to the next disc as the subcode information is regenerated by a writer since the subcode data will be different from the original. Upon the installation of the programs from the new disc, the disc identifier data will no longer be present and the program cannot be installed again. This provides copy protection. The key to installing all other data, mastered in or recorded to the disc, in a computer is the software identifier data recorded in the software identifier track 55, such software identifier data being provided to a computer user upon purchase by the user of the hybrid optical recording disc 10.

Since the hybrid optical recording disc 10 contains mastered data tracks in a read-only memory (ROM) area 30, and mastered tracks in a recordable area 50 in which user-generated data can be programmably recorded by a user, the disc 10 is also referred to as a compact disc with programmable and read-only memory, or in short notation, as a CD-PROM.

Figure 3:
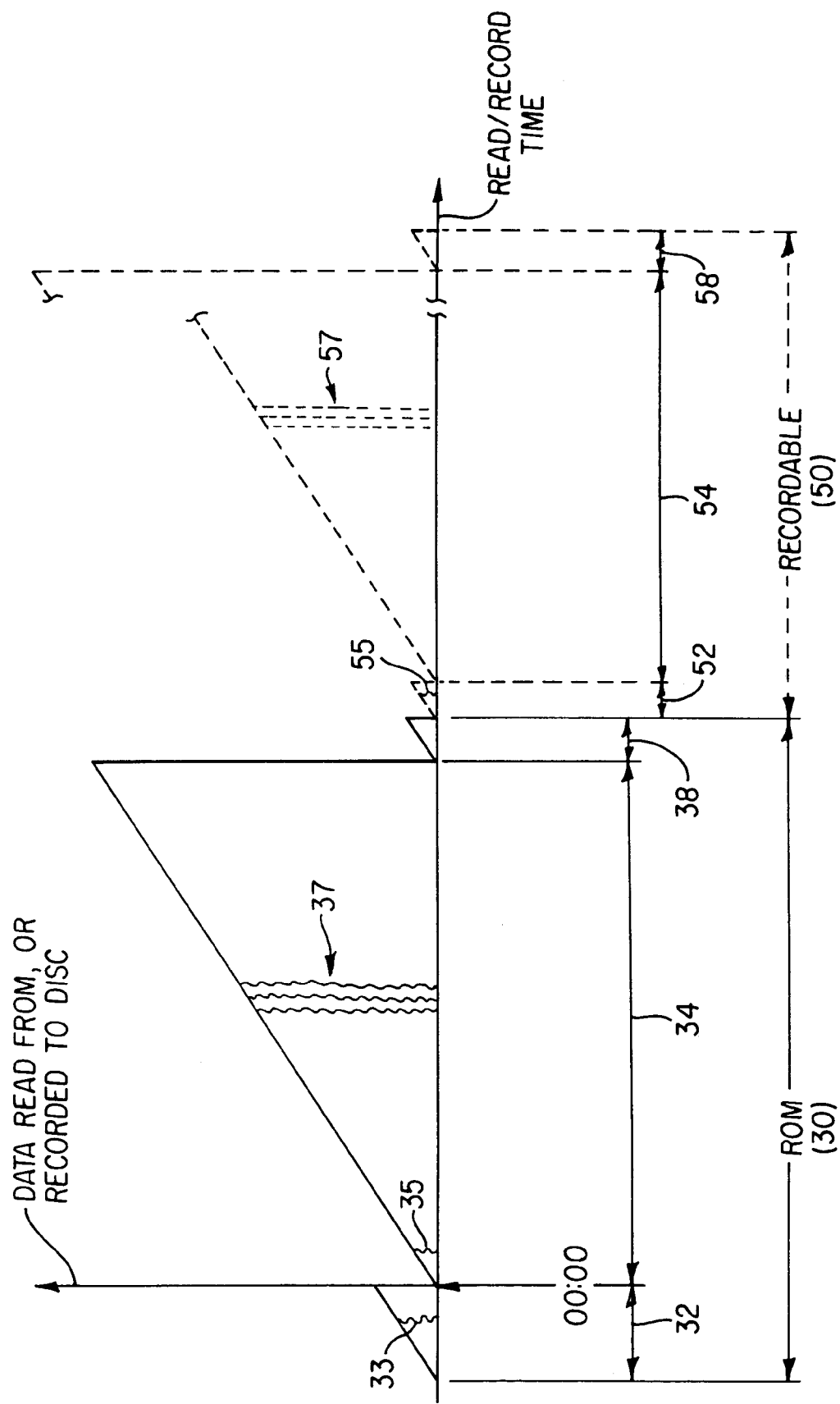
FIG. 3 is a schematic diagram showing a relationship between reading data from, or recording data to, a hybrid optical recording disc versus read/record time.

Turning to FIG. 3, a relationship is shown schematically between data read from or recorded to the disc 10 and a read/record time. When a computer user inserts the disc 10 into a CD-ROM drive of a computer, addressing data contained in addressing tracks within the ROM lead-in area 32 will issue instructions to the computer user and to the computer regarding the selection of particular program tracks 37 of the ROM program area 34, or selection of particular program tracks 57 of the program area 54 of the recordable area 50. However, the addressing data, including the disc identifier data embedded in track 33 within the lead-in area 32 (or within one of the aforementioned PCA or PMA tracks) will not be transferred to a memory device of the computer such as, for example, to a hard disc of the computer.

The computer user selects a particular software program mastered in selected program tracks 37 of the ROM program area 34 by entering into the computer the software identifier data recorded in the software identifier track 55 within the recordable area 50, such software identifier data or such software identifier code having been provided to the user upon purchase of the CD-PROM. The selected software program will then be installed from the ROM program tracks 37 to a memory device of the computer, and the user can then work with the selected software program to generate data which are stored in the computer for subsequent retrieval therefrom for the purpose of recording the user-generated data in selected program tracks 57 of the recordable program area 54.

Transfer of data from the ROM program area 34 to the computer commences at a time equal to or greater than a time of "00:00" shown schematically as a termination time of the lead-in area 32 and as a start time of the ROM program area 34. In FIG. 3, features of the ROM area 30 are shown in solid outline, and features of the recordable area 50 are shown in dashed outline to enhance visual clarity of the drawing.

Figure 4:
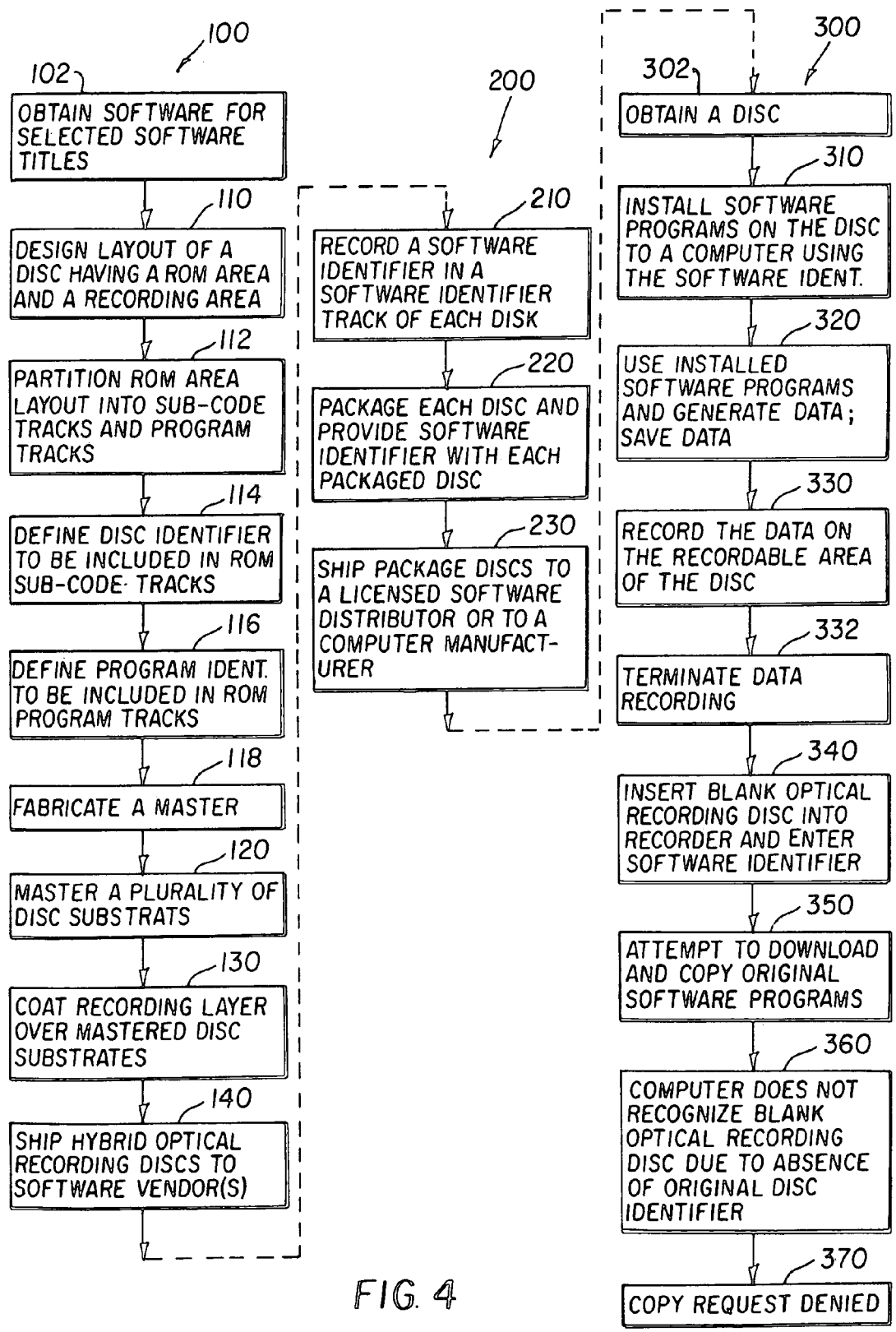
FIG. 4 is a schematic process flow diagram which indicates the process steps performed by a manufacturer of a hybrid optical recording disc, the process steps associated with a software provider, and the process steps a computer user might employ in using the hybrid optical recording disc of the present invention.

Turning to FIG. 4, there is shown a schematic flow chart of a process sequence 100 which may be used by a disc manufacturer in the production of hybrid optical recording discs having the features in accordance with the present invention, a sequence of steps 200 undertaken by a software provider, and a sequence of steps 300 which a computer user may choose in using a disc configured in accordance with the present invention.

In a step 102 the disc manufacturer obtains software for selected software titles to be included in the ROM area of the hybrid optical recording disc. Software may be obtained, for example, by a licensing agreement or by another arrangement with one or more software providers. It will be appreciated that the step 102 will be eliminated if the disc manufacturer uses either software which is in the public domain, or the disc manufacturer uses self-created software titles. In step 110 the disc manufacturer designs a layout of a disc having a ROM area and a recordable area using the selected software titles; in step 112 the design of the ROM area layout is further partitioned into sub-code tracks and program tracks; in a step 114 a disc identifier is defined to be included in the ROM sub-code tracks of the disc; in step 116 a program identifier is defined to be included in the ROM program tracks of a disc; in step 118 a master is fabricated to include all of the tracks (in the form of a spiral groove) and all of the addressing data and program data to be contained in the ROM area of a mastered disc; in step 120 a plurality of disc substrates are mastered; in step 130 a recording layer is coated over each of the mastered disc substrates (including the steps of forming a reflective layer over the recording layer, and forming a protective layer over the reflective layer); in a step 140 the disc manufacturer ships packaged hybrid optical recording discs to a software provider or to software providers.

A software provider records in a step 210 a software identifier in a software identifier track of the recordable area of each disc. Alternatively, this recording step 210 may be performed by the disc manufacturer upon agreement with the software provider. In that case, the disc manufacturer would record the software identifier in a process step introduced between the steps 130 and 140 of the disc manufacturing process 100. This procedure would also apply if the software programs were developed by the disc manufacturer.

In a step 220 the software provider packages each disc and provides the software identifier with each packaged disc; in a step 230 the software provider ships packaged discs to a software distributor or to a computer manufacturer for eventual sale to computer users. Alternatively, the disc manufacturer can sell discs directly to computer users if the software programs were developed by the disc manufacturer.

A computer user obtains a hybrid optical recording disc constructed in accordance with the present invention in a step 302; in step 310 the user installs the software programs contained on the disc to a computer by entering the software identifier; in step 320 the computer user uses the installed software programs and generates data. The user saves these data in a memory device of the computer such as, for example, on the hard disc of the computer. In step 330 the user records the data on the recordable area of the hybrid optical recording disc by using a recorder which is operative under the control of the computer; upon completion, the data recording is terminated in step 332; in a step 340 the user now inserts a blank optical recording disc into the recorder and enters the software identifier in an attempt to download and to copy the original software programs, as depicted in a step 350; in a step 360 it becomes apparent to the computer user that the computer does not recognize the blank optical recording disc due to the absence in the blank optical recording disc of a disc identifier provided in the disc identifier sub-code track 33 of the ROM area 30 of the original hybrid optical recording disc 10; accordingly in a step 370 the computer user's request to copy the software programs from the original disc to a blank optical recording disc is denied. Thus, the software programs in the ROM area of the originally obtained hybrid optical recording disc are protected against copying, while programs of such a disc can be readily installed on a computer.

It will be appreciated that the process steps of FIG. 4 are merely illustrative, and such steps may vary in their respective sequences and procedures.

The invention has been described in detail with particular reference to certain preferred embodiments thereof, but it will be understood that variations and modifications can be effected within the spirit and scope of the invention.

PARTS LIST 10 hybrid optical recording disc
12 substrate
14 inner peripheral edge
16 central hole
18 outer peripheral edge
20 recording layer
30 read-only memory (ROM) area
32 lead-in area of ROM area
33 disc identifier sub-code track
34 program area of ROM area
35 program identifier track of ROM area
37 program tracks of ROM area
38 lead-out area of ROM area
50 recordable area
52 lead-in area of recordable area
54 program area of recordable area
55 software identifier track of recordable area
57 program tracks of recordable area
58 lead-out area of recordable area

What is claimed is:

1. A hybrid optical recording disc with copy protection for use in a computer, the disc having a substrate and a recording layer disposed over the substrate, the substrate having a mastered read-only memory (ROM) area and which includes addressing tracks dedicated to contain disc addressing data which govern read and record processes to and from a computer, and program tracks dedicated to contain computer software programs, and the substrate having a recordable area for recording therein data generated by a computer user and for reading such recorded data from the recordable area to a computer, comprising:

a) the addressing tracks of the ROM area include at least one disc identifier sub-code track containing disc identifier data embedded therein such that the disc identifier data will authenticate the installed disc addressing data and computer software programs for operation in the computer from the hybrid optical recording disc but will not be transferred, thereby providing protection against copying the disc;

b) the program tracks of the ROM area include at least one program identifier track containing program identifier data embedded therein which identify the computer software programs; and c) the recordable area includes at least one software identifier track containing software identifier data recorded therein of the computer software programs which are included in the program tracks of the ROM area of the hybrid optical recording disc.

2. The hybrid optical recording disc of claim 1 wherein the recordable area of the hybrid optical recording disc includes a recordable program area for recording therein data generated by a computer user and for reading such recorded data from the recordable program area to the computer.

3. The hybrid optical recording disc of claim 1 wherein the disc identifier data are embedded in a disc identifier sub-code track within a lead-in area of the ROM area.

4. A method of providing a hybrid optical recording disc with copy protection for use in a computer, comprising the steps of:

a) mastering a read-only memory (ROM) area and a recordable area on a disc substrate so that the ROM area includes addressing tracks and program tracks, the addressing tracks including at least one disc identifier sub-code track for embedding therein authenticating disc identifier data which will not be transferred from the computer when installing the disc in the computer, thereby providing protection against copying the disc, the program tracks of the ROM area including at least one program identifier track containing program identifier data embedded therein which identify computer software programs contained in the ROM program tracks;

b) coating an optical recording layer over the mastered disc substrate; and c) recording in a designated software identifier track of the recordable area a software identifier, the software identifier recording step being implemented in correspondence with the software programs included in the program tracks of the disc's ROM area, the software identifier also being provided to a computer user and corresponding to a hybrid optical recording disc having selected software program titles contained in the program tracks of the ROM area.

5. A hybrid optical recording disc having copy protection for use in a computer, comprising:
   (a) a read-only area having preformed information including at least one program and disc identifier data, the disc identifier data being adapted to authenticate a transferred program in the computer to permit the program to be operated by the computer, said disc identifier data being identical to disc identifier data on a plurality of other discs; and
   (b) a recordable area including at least one software identifier track containing software identifier data recorded therein of the computer software programs which are included in the program tracks of the ROM area of the hybrid optical recording disc, said software identifier data being unique and different for each disc with the same disc identifier data.

6. A hybrid optical recording disc with copy protection for use in a computer, the disc having a substrate and a recording layer disposed over the substrate, the substrate having a mastered read-only memory (ROM) area and which includes addressing tracks dedicated to contain disc addressing data which govern read and record processes to and from a computer, and program tracks dedicated to contain computer software programs, and the substrate having a recordable area for recording therein data generated by a computer user and for reading such recorded data from the recordable area to a computer, comprising:
   a) the addressing tracks of the ROM area include at least one disc identifier sub-code track containing disc identifier data embedded therein such that the disc identifier data will authenticate the installed disc addressing data and computer software programs for operation in the computer from the hybrid optical recording disc but will not be transferred, thereby providing protection against copying the disc, said disc identifier data being identical to disc identifier data on a plurality of other discs;
   b) the program tracks of the ROM area include at least one program identifier track containing program identifier data embedded therein which identify the computer software programs; and
   c) the recordable area includes at least one software identifier track containing software identifier data recorded therein of the computer software programs which are included in the program tracks of the ROM area of the hybrid optical recording disc, said software identifier data being unique and different for each disc with the same disc identifier data.

7. A hybrid optical recording disc with copy protection for use in a computer, the disc having a substrate and a recording layer disposed over the substrate, the substrate having a mastered read-only memory (ROM) area and which is comprised of one or more of the group consisting of a power calibration area (PCA), a program memory area (PMA), a lead-in area, a program area, and a lead-out area, and the substrate having a recordable area for recording therein data generated by a computer user and for reading such recorded data from the disc to a computer, comprising:
   a) the lead-in area of the ROM area includes addressing tracks dedicated to disc addressing data which govern read and record processes to and from a computer;
   b) a disc identifier sub-code track containing disc identifier data embedded in one of said power calibration area (PCA), a program memory area (PMA), an addressing track of said lead-in area therein, such disc identifier data authentication for computer operation but will not be transferred from the computer to thereby provide protection against copying the disc, said disc identifier data being identical to disc identifier data on a plurality of other discs;
   c) the program area of the ROM area contains program tracks dedicated to program data corresponding to computer software programs and such program data will be transferred to a memory device of a computer when installing the hybrid optical recording disc on the computer;
   d) the program area of the ROM area includes at least one program identifier track containing program identifier data embedded therein which identifies the computer software programs;
   e) the lead-out area of the ROM area contains data instructing a computer of a termination of the ROM program area and data indicating a start of a new lead-in area associated with a recordable area of the hybrid optical recording disc; and
   f) the recordable area of the disc includes at least one software identifier track in the recordable area, the software identifier track containing software identifier data recorded therein of the computer software programs which are included in the program tracks of the ROM area of the disc, such software identifier data being provided to a computer user, thereby enabling installation of the disc's software program data on a computer and said software identifier data being unique and different for each disc with the same disc identifier data.

8. The hybrid optical recording disc of claim 7 wherein the recordable area of the hybrid optical recording disc includes a recordable program area for recording therein data generated by a computer user and for reading such recorded data from the recordable program area to the computer.

9. A method of providing a hybrid optical recording disc with copy protection for use in a computer, comprising the steps of
   a) mastering a read-only memory (ROM) area and a recordable area on a disc substrate so that the ROM area includes addressing tracks and program tracks, the addressing tracks including at least one disc identifier sub-code track for embedding therein authenticating disc identifier data which will not be transferred from the computer when installing the disc in the computer, thereby providing protection against copying the disc, the program tracks of the ROM area including at least one program identifier track containing program identifier data embedded therein which identify computer software programs contained in the ROM program tracks;
   b) coating an optical recording layer over the mastered disc substrate; and
   c) recording in a designated software identifier track of the recordable area a software identifier, the software identifier recording step being implemented in correspondence with the software programs included in the program tracks of the disc's ROM area, the software identifier also being provided to a computer user and corresponding to a hybrid optical recording disc having selected software program titles contained in the program tracks of the ROM area.

10. The hybrid optical recording disc of claim 9 wherein said disc identifier data is identical to disc identifier data on a plurality of other hybrid optical recording discs, said software identifier data is unique and different for each disc with the same disc identifier data.

11. The hybrid optical recording disc of claim 6 wherein the disc identifier data are embedded in a disc identifier sub-code track within a lead-in area of the ROM area.

* * * * *